United States Patent [19]
Lee et al.

[11] Patent Number: 5,758,287
[45] Date of Patent: May 26, 1998

[54] HUB AND REMOTE CELLULAR TELEPHONE SYSTEM

[75] Inventors: William Chien-Yeh Lee, Danville; David Anthony Pasquel, Laguna Beach, both of Calif.; Ronald S. Rudokas, Littleton, Colo.

[73] Assignee: AirTouch Communications, Inc., San Francisco, Calif.

[21] Appl. No.: 705,012

[22] Filed: Aug. 29, 1996

Related U.S. Application Data

[63] Continuation of Ser. No. 246,623, May 20, 1994.

[51] Int. Cl.$^6$ .............................. H04Q 7/20; H04Q 7/22
[52] U.S. Cl. ...................... 455/450; 455/103; 455/432; 455/436; 455/509; 455/562
[58] Field of Search .................................. 379/58, 59, 60; 359/152, 172, 173; 455/33.1, 33.2, 33.3, 33.4, 34.1, 53.1, 56.1, 103, 422, 424, 429, 436, 442, 447, 448, 449, 450–454, 500, 507, 509, 514, 516, 517

[56] References Cited

U.S. PATENT DOCUMENTS

| | | |
|---|---|---|
| 3,522,540 | 8/1970 | Lee . |
| 3,745,464 | 7/1973 | Lee . |
| 3,764,915 | 10/1973 | Cox et al. ............................. 455/452 |
| 4,144,411 | 3/1979 | Frenkiel . |
| 4,249,181 | 2/1981 | Lee . |
| 4,562,572 | 12/1985 | Goldman et al. . |
| 4,607,375 | 8/1986 | Lee . |
| 4,611,212 | 9/1986 | Lee . |
| 4,616,364 | 10/1986 | Lee . |
| 4,672,655 | 6/1987 | Koch . |
| 4,750,175 | 6/1988 | Brenneman et al. . |
| 4,775,998 | 10/1988 | Felix et al. . |
| 4,797,947 | 1/1989 | Labedz . |
| 4,799,253 | 1/1989 | Stern et al. . |
| 4,901,307 | 2/1990 | Gilhousen et al. . |
| 4,932,049 | 6/1990 | Lee . |
| 4,955,082 | 9/1990 | Hattori et al. . |
| 4,999,833 | 3/1991 | Lee . |
| 5,067,147 | 11/1991 | Lee . |

(List continued on next page.)

FOREIGN PATENT DOCUMENTS

| | | |
|---|---|---|
| 0 265 178 | 4/1988 | European Pat. Off. . |
| 0 368 673 | 5/1990 | European Pat. Off. . |
| WO 92/10890 | 6/1992 | WIPO . |

OTHER PUBLICATIONS

Norbury, J.R., "Satellite land mobile communication systems", *Electronics & Communication Engineering Journal*, pp. 245–253, Nov./Dec. (1989), No. 6, London, GB.

Stjernvall, Jan–Erik, "Calculation of Capacity and Co–Channel Interference in a Cellular System", Nordic Seminar on Digital Land Mobile Radiocommunication, 5–7 Feb. 1985, Espoo, Finland, pp. 209–216.

Whitehead, James F., "Cellular System Design: An Emerging Engineering Discipline", *IEEE Communications Magazine*, pp. 8–15, Feb. 1986 – vol 24, No. 2.

Suzuki, K. et al., "A New Method Which Optimizes Frequency Reuse in Cellular Radio Systems", *IEEE*, pp. 322–327, 1984.

Brochure—1989 International Symposium on Antennas and Propagation, Japan Aug. 22–25, 1989.

Xia, H. H. et al., "Radio Propagation Measurements and Modelling for Line–of–Sight Microcellular Systems", *IEEE*, pp. 349–354, 1992.

*Primary Examiner*—Curtis Kuntz
*Assistant Examiner*—Nay Maung
*Attorney, Agent, or Firm*—Merchant, Gould, Smith, Edell, Welter & Schmidt

[57] ABSTRACT

The present invention discloses a hub and remote cellular system having RF generating equipment located at a centralized hub, and RF front end equipment located at each of a plurality of remote omni-directional cell sites. The centralized hub distributes channels for the remote cell sites. The hub and remote structure provides for the efficient allocation of resources to a plurality of cell sites, lowers equipment costs, real estate costs, regulatory costs, and maintenance costs.

14 Claims, 4 Drawing Sheets

U.S. PATENT DOCUMENTS

| | | |
|---|---|---|
| 5,073,900 | 12/1991 | Mallinckrodt . |
| 5,081,703 | 1/1992 | Lee . |
| 5,101,501 | 3/1992 | Gilhousen et al. . |
| 5,103,459 | 4/1992 | Gilhousen et al. . |
| 5,109,390 | 4/1992 | Gilhousen et al. . |
| 5,193,109 | 3/1993 | Lee . |
| 5,216,703 | 6/1993 | Roy . |
| 5,218,618 | 6/1993 | Sagey . |
| 5,220,680 | 6/1993 | Lee . |
| 5,243,598 | 9/1993 | Lee .......... 370/95.3 |
| 5,321,736 | 6/1994 | Beasley ........ 455/422 |
| 5,339,184 | 8/1994 | Tang ........... 359/124 |

HUB AND REMOTE CELLULAR TELEPHONE SYSTEM

This is a File Wrapper Continuation of application Ser. No. 08/246,623, filed May 20, 1994.

BACKGROUND OF THE INVENTION

1. Field of the Invention

This invention relates generally to cellular telephone systems, and more particularly, to a hub and remote structure for cellular telephone systems.

2. Description of Related Art

In cellular telecommunications, when call traffic in a particular area increases, increased capacity may be created by reducing the area covered by a particular cell and increasing the number of cells. Although in the proper circumstances reduced cell size is advantageous, certain problems can arise. Naturally, the smaller the cells, the more handoffs are required between cells. Moreover, additional equipment costs are incurred because of the increased number of cell sites.

In typical cellular telephone systems, cell site infrastructure tends to be used inefficiently. For example, the cell sites are typically configured so that only a fraction of the available hardware capacity can be used. Moreover, there are no provisions made for sharing resources between cell sites, because each cell site is essentially independent. Thus, there is a need in the art for cell site platforms that provide the most efficient possible use of hardware capacity.

SUMMARY OF THE INVENTION

To overcome the limitations in the prior art described above, and to overcome other limitations that will become apparent upon reading and understanding the present specification, the present invention discloses a hub and remote structure having RF equipment located at a centralized hub that is coupled to a plurality of remote omni-directional or sectored cell sites that have only RF front end equipment. The centralized hub supports a large number of distributed channels that can be shared among the remote cell sites. In addition, the present invention increases channel efficiency by permitting softer handoffs (i.e., no frequency changes) between the remote cell sites.

An object of the present invention is to provide more efficient utilization of equipment in the hub and remote structure. Another object of the invention is to provide an improved cell configuration that provides more uniform signal coverage, lowered interference levels, increased capacity, improved voice quality, and relatively simple and economical construction. An advantage of the present invention is that it provides a significant reduction in capital costs. Another advantage of the present invention is that much less equipment is used at the remote cell sites than traditional cell sites, which makes it easier to locate the remote cell sites or to integrate into existing cell that are space constrained. Thus, some remote cell sites can be moved from buildings onto telephone poles or other simplified structures. Further, additional site locations can be considered because of the lower cost of locating remote cell sites as compared to traditional systems. Moreover, the remote cell sites have fewer regulatory or lease problems than traditional cell sites.

BRIEF DESCRIPTION OF THE DRAWINGS

Referring now to the drawings in which like reference numbers represent corresponding parts throughout.

DETAILED DESCRIPTION OF THE PREFERRED EMBODIMENT

In the following description of the preferred embodiment, reference is made to the accompanying drawings which form a part hereof, and in which is shown, by way of illustration, a specific embodiment in which the invention may be practiced. It is to be understood that other embodiments may be utilized and structural changes may be made without departing from the scope of the present invention.

HUB AND REMOTE STRUCTURE

Figure 1:
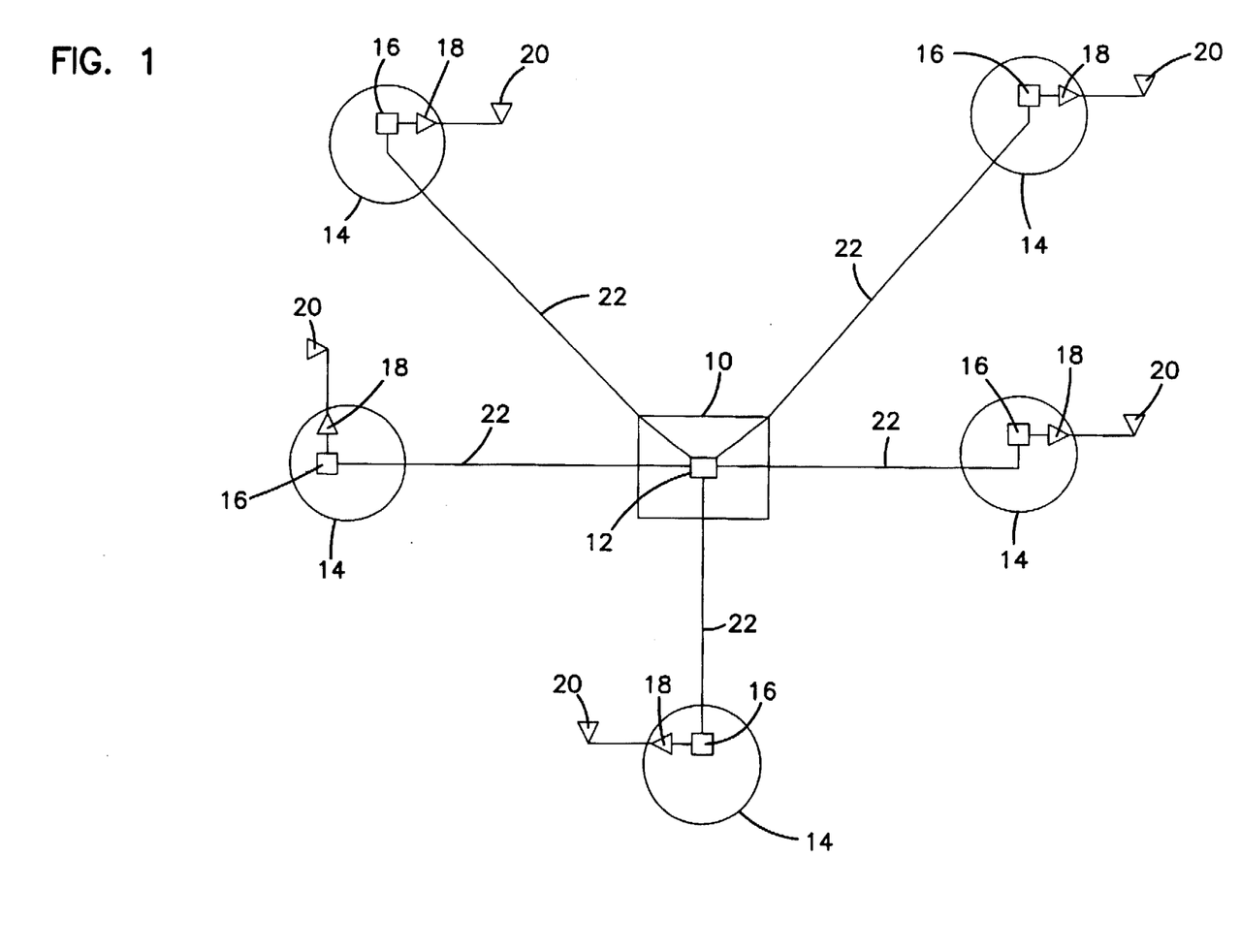
FIG. 1 illustrates a block diagram of the present invention.

FIG. 1 is a block diagram illustrating the structure of the present invention. The present invention discloses a hub and remote structure, wherein a centralized hub 10 containing the bulk of the cellular equipment 12 is coupled to a plurality of remote omni-directional cell sites 16 containing RF front-ends consisting essentially of power filters 16, amplifiers 18, and antennae 20. The hub 10 and remote cell sites 14 communicate via fiber, microwave, or cable links 22.

RF COVERAGE

Figure 2:
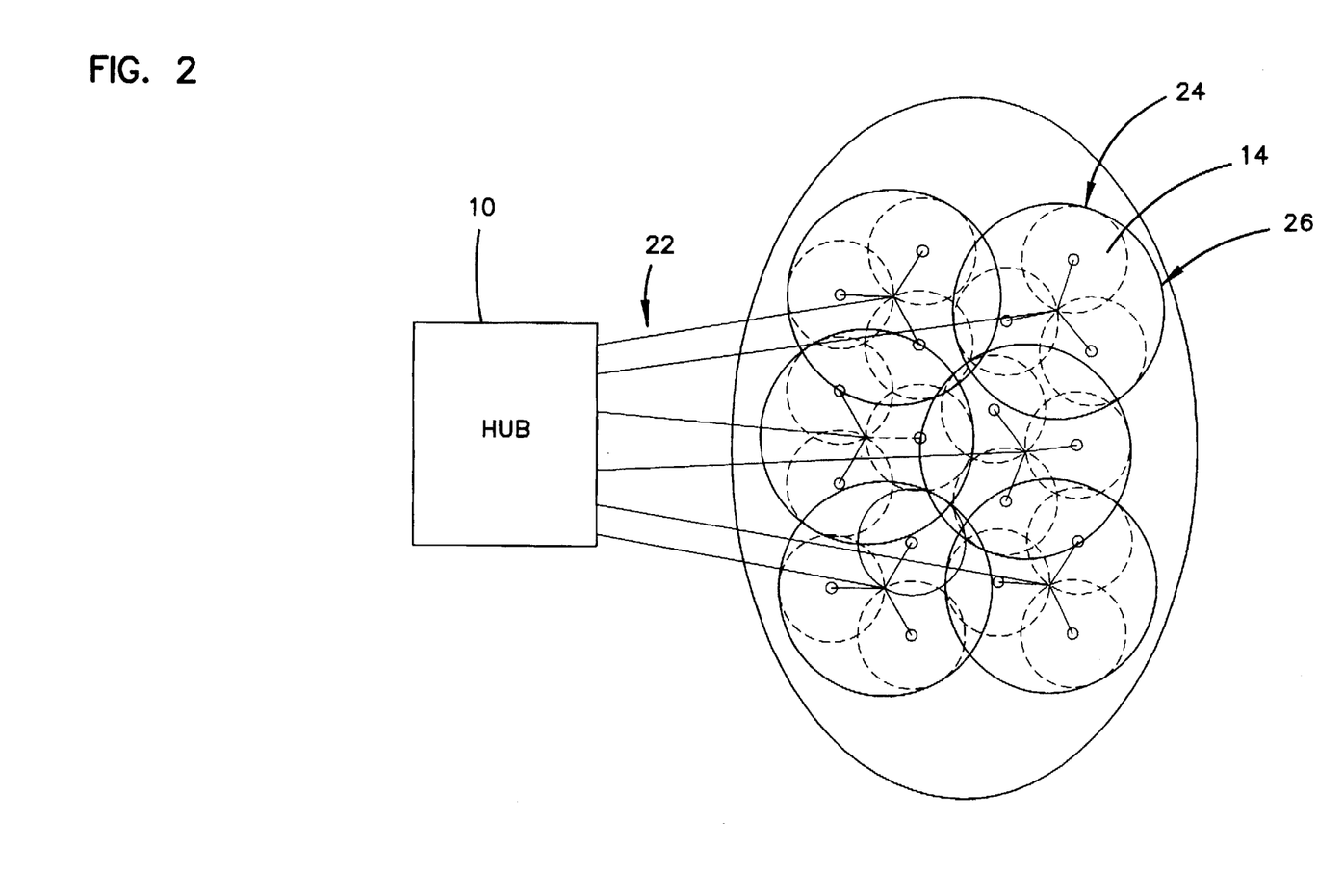
FIG. 2 illustrates the RF coverage of the present invention.

FIG. 2 illustrates an example of RF coverage of the hub and remote structure according to the present invention. The centralized hub 10 is coupled to a plurality of remote cell sites 14. Preferably, there are between 11 to 23 remote cell sites 14 per hub 10, although any number of remote cell sites 14 could be possible. The dashed perimeter lines 24 of the remote cell sites 14 are intended to represent the limits of RF coverage for each respective remote cell site 14. However, due to the shape of terrain and the presence of buildings and other structures, the actual perimeter of each remote cell site 14 may be of an irregular shape. The remote cell sites 14 are grouped together for channel sharing purposes. In the preferred embodiment, each group is comprised of three remote cell sites 14 as indicated by solid perimeter lines 26.

Each remote cell site 14 comprises a minimal amount of equipment that can be mounted externally on telephone poles, street lights, buildings and other structures with or without a battery backup and the equipment does not require a building as does traditional cellular systems. Included with this minimal amount of equipment is an omni-directional antenna set located substantially at the center of each remote cell site 14. The directionality of the antenna set is achieved through an omni-directional reflector, or any other suitable arrangement to provide the desired directionality and coverage. Each antenna set has its own zone of major influence for transmitting and receiving signals that is limited to be substantially within the boundaries of the remote cell site 14, although adjacent zones of influence of adjacent remote cell sites 14 overlap.

FIRST EMBODIMENT

Figure 3:
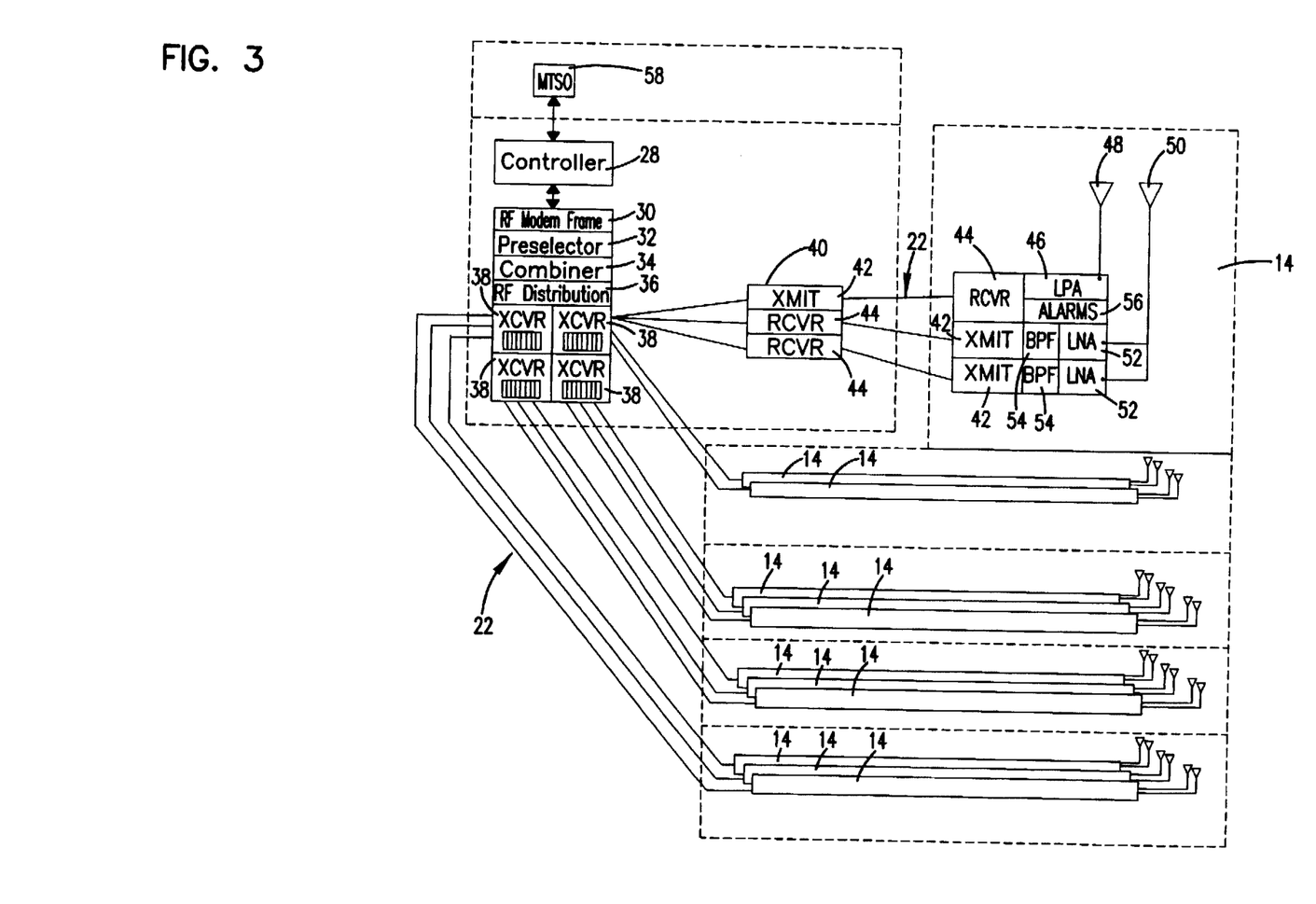
FIG. 3 illustrates a block diagram of the hub and the remote cell sites according to a first preferred embodiment of the present invention.

FIG. 3 illustrates a block diagram of the hub 10 and the remote cell sites 14 according to a first preferred embodiment of the present invention. The hub 10 includes a controller 28 and one or more RF modem frames 30 comprised of a preselector 32, combiner 34, RF distribution module 36, and a plurality of transceiver cages 38. The controller 28 controls the operations of components of the hub 10 and remote cell sites 14. The RF modem frame 30, which would normally be located at the remote cell site 14, provides the equipment racks and interconnects necessary to operate the components of the hub 10. The preselector 32 performs filtering and power amplification. The combiner 34 multiplexes the various channels. The RF distribution module 36 generates the necessary RF signals for the multiplexed channels, and feeds them to the transceiver cages 38. The transceiver cages 38 modulate the multiplexed channels to create RF signals and transmit these RF signals to the remote cell sites 14. A fiber, microwave or cable link 22 communicates the signals between the hub 10 and the remote cell sites 14 using up/down frequency convertors 40 having transmitters 42 and receivers 44.

Each remote cell site 14 contains an RF front-end, including linear power amplifiers (LPA) 46, antennae 48 for transmitting RF signals, antennae 50 for receiving RF signals, low noise amplifiers (LNA) 52, and bandpass filters (BPF) 54. Further, alarming equipment 56 is provided to monitor the operation of the remote cell sites 14. The amplifiers 46 and 52, filters 54, antennae 48 and 50, and alarming equipment 56 may be of any type suitable for the stated purpose.

Signals received from the remote cell sites 14 are coupled to the transceiver cages 38 for de-modulation. The RF distribution module 36 receives RF signals for the multiplexed channels from the transceiver cages 38, and feeds them to the combiner 34. The combiner 34 then de-multiplexes the various channels, and the preselector 32 filters and amplifies the signals. The controller 28 routes the calls as necessary, for example, to a mobile telephone switching office (MTSO) 58.

In the structure of the first preferred embodiment, the RF modem frame 30 has four transceiver cages 38. Each transceiver cage 38 may be coupled to three remote omni-directional cell sites 14. To the transceiver cage 38, the three remote cell sites 14 appear to be a single cell site with three sectors. Thus, the system can perform soft handoffs between the three remote cell sites 14, which improves the quality of the system and reduces the possibility of dropped calls.

All channels within a transceiver cage 38, configured for a three sector cell, are available to the three independent remote cell sites 14. This increases channel efficiency by permitting softer handoffs between the three remote cell sites 14, as well as decreasing the required number of channels cards required. Further, the four transceiver cages 38 within the RF modem frame 30 can operate in the same RF band.

For example, if four transceiver cages 38 are actively employed and each transceiver cage 38 can support three sectors, then effectively there can be 12 omni-directional cell sites coupled to the RF modem frame 30. Further, since each sector of each transceiver cage 38 is treated as a remote omni-directional cell site 14, the hub 10 can be fully populated with transceiver cages 38 while providing service on a single RF carrier.

In addition, the utilization of the entire transceiver cage 38 can be maximized by using six sectors per transceiver cage 38 and eliminating the backup transceiver cage 38. For example, if four transceiver cages 38 are actively employed in each RF modem frame 30, and each transceiver cage 38 is configured to support six sectors, then the hub 10 can support 24 remote omni-directional cell sites 14.

Tables I–V illustrate the efficiencies gained through the first preferred embodiment of the present invention. Table I shows the channel efficiency (using Erlang B at 1% blocking) of a prior art Motorola configuration. However, a number of constraints impact the maximum capacity of the Motorola configuration. First, there are only 64 allowable Walsh codes per RF channel in a typical code division multiple access (CDMA) system. Therefore, the maximum channel elements allowable per RF channel per sector or site is 64. Further, based on conservative design rules that provide a capacity gain of 10x over prior analog cellular systems and assume that the system exhibits traffic patterns that include 30% of Erlang traffic in two-way soft handoffs and 10% of Erlang traffic in three-way soft handoffs, then the maximum number of channels is 27 and the maximum Erlang capacity is 17.8. Utilizing this Erlang capacity, Table II illustrates the effect of traffic supported by the prior art Motorola configuration.

With the constraint of one RF channel per transceiver cage in the prior art Motorola configuration, no transceiver cages will be fully populated. At initial turn-up, only one of four possible transceiver cages is utilized. There is a 16% reduction in channel elements between three omni and one sectored site supporting the same Erlang traffic due to trunking efficiencies.

It is assumed that, in the prior art Motorola configuration, additional capacity is added with additional RF channels. For example, it is assumed that four unique RF channels can be supported in the prior art Motorola configuration. As additional transceiver cages are added, the Erlang capacity increases in direct proportion to the added transceiver cages. However, channel resources cannot be shared between the transceiver cages, as each transceiver cage is essentially independent. This modifies Table II to create the value shown in Table III. As indicated in Table III, a completely built out prior art Motorola configuration, having four RF channels and three sectors per RF channel, utilizes 43% of its total channel capacity and delivers 38% of the maximum Erlang capacity. However, it is unlikely that the prior art Motorola configuration could actually utilize four unique RF channels.

In the present invention, the system is designed with the RF modem frame centralized and the channels distributed and coupled to an array of remote omni-directional cell sites, wherein each cell site is treated as a sector. By doing so, all channels within a transceiver cage, configured for a three sector cell, are available to the three independent remote cell sites. This increases channel efficiency by permitting softer handoffs between the three cell sites, as well as making financial gains by decreasing the required number of channels as previously illustrated. Further, the four transceiver cages within the RF modem frame can operate in the same band. Table IV outlines the increased deficiencies due to this structure.

In Table IV, the assumption is that the transceiver cages will only support three sectors. Keeping in mind that each sector can be treated as a remote omni-directional cell site, the RF modem frame can be fully populated with transceiver cages while providing service on one RF carrier. The 300% increase in Erlang capacity is indicative of the capability of the present invention to provide increased capacity on one RF channel. Furthermore, for a three sector site, the maximum channel elements utilized per transceiver cage is 68. Therefore, in order to maximize utilization of the entire transceiver cage, a six sector per transceiver cage approach is required. Table V illustrates the efficiencies resulting from such a configuration. Moreover, only minimal re-engineering is required for the channel cards and the transceiver cage to support the additional three sectors in a six sector configuration. Thus, the full capacity of the hardware can be utilized to provide more efficient utilization of equipment and a reduction in capital costs. Further, since the remote sites are physically detached from the hub, only one RF channel is required.

SECOND EMBODIMENT

Figure 4:
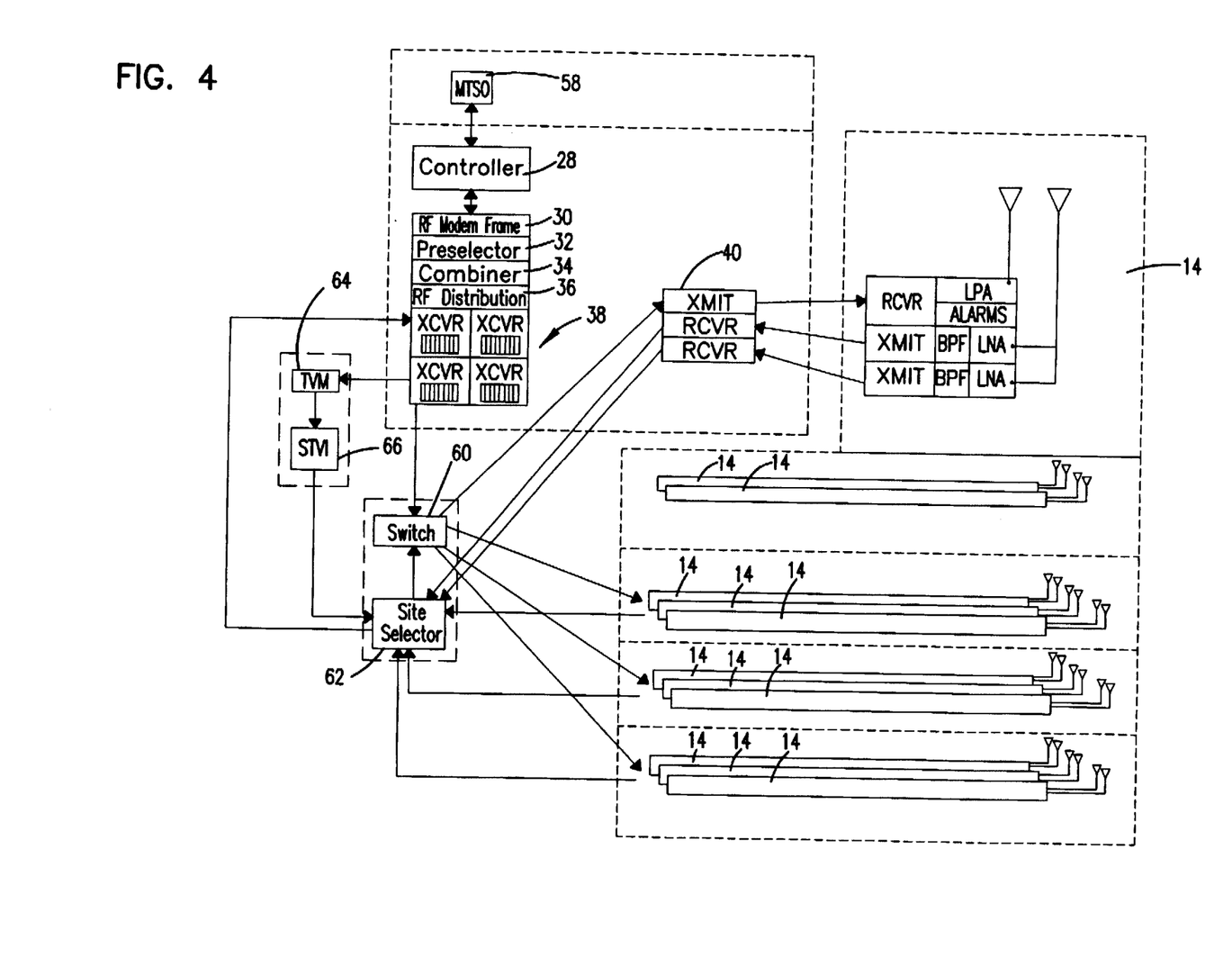
FIG. 4 illustrates a block diagram of the hub and the remote cell sites according to a second preferred embodiment of the present invention.

FIG. 4 illustrates a block diagram of the hub and the remote cell sites according to a second preferred embodiment of the present invention. In the structure of the second preferred embodiment, the hub 10 intelligently distributes all of the channels among the remote sites 14. Like FIG. 3, the RF modem frame 30 has four transceiver cages 38 at the hub 10. Each of transceiver cages 38 are coupled to a switch 60 (through which RF signals are transmitted) and a site selector 62 (through which RF signals are received). The switch 60 and site selector 62 are coupled to each of the remote cell sites 14. A traffic volume meter (TVM) 64 is coupled either to the RF modem frame 30 or switch 60 or site selector 62, wherein the TVM 64 measures the traffic volume through the hub 10. A site traffic volume indicator (STVI) 66 is coupled to the TVM 64, wherein the STVI 66 calculates the composite traffic volume at each remote cell site 14 at some interval, and in response thereto controls the switch 60 and site selector 62 to configure the number of channels assigned to the various remote cell sites 14.

To the transceiver cages 38, all of the remote cell sites 14 appear to be a single cell site with a plurality of sectors. All channels within the RF modem frame 30 are available to each of the remote cell sites 14. Thus, the hub 10 can dynamically allocate channels to any one or more of the remote cell sites 14. Moreover, this arrangement increases channel efficiency by permitting the hub 10 to perform soft handoffs between the remote cell sites 14, as well as decreasing the required number of channels cards required.

CONCLUSION

In conclusion, the present invention discloses a hub and remote structure having RF equipment located at a centralized hub that is coupled to a plurality of remote omni-directional or sectored cell sites that have only RF front end equipment. The centralized hub supports a large number of distributed channels that can be shared among the remote cell sites. In addition, the present invention increases channel efficiency by permitting softer handoffs (i.e., no frequency changes) between the remote cell sites. As a result, the present invention uses less cell site space, centralizes equipment and reduces the amount of equipment necessary to provide the same capacity, improves the quality of transmissions because soft handoffs occur between omni-directional cell sites that are within the same cage, and allows dynamic allocation of those channels within the cell site, so any cell site within a cage can access any of the channels within that transceiver cage.

The present invention differs from the prior art in several important aspects. The most important aspect is that the present invention operates as a "macro" system, wherein the bulk of the RF equipment is centralized at the hub 10. Thus, the present invention avoids having the bulk of the RF equipment, specifically the RF modem frame 30 and its components, at every cell site 14.

The structure of the hub and remote system of the present invention achieves more efficient utilization of hardware capacity. For example, a typical prior art Motorola configuration locates the RF modem frame 30 at each cell site 14, and thus there can be no sharing of the elements contained therein with other cell sites 14. Moreover, the RF modem frame 30 in a Motorola RF modem frame is typically only partially populated with transceiver cages 38, and thus it is under utilized. In contrast, the present invention centralizes the RF modem frame 30 at the hub 10 and distributes the channels to a plurality of remote cell sites 14.

The present invention also allows more efficient allocation of channels. In the prior art, channels are allocated in a fixed manner to specific cell sites 14. However, the present invention dynamically allocates channels on a real-time basis. Therefore, if one remote cell site 14 needs the channels, it can allocate them when the other remote cell sites 14 don't need the channels. On the other hand, should needs change among the remote cell sites 14, because of changes in traffic patterns, then the system can re-allocate the channels so that the other remote cell sites 14 have the ability to access additional channels.

Various modifications of the invention, in addition to those shown and described herein, will be apparent to those skilled in the art from the foregoing description and accompanying drawings. Such modifications are intended to fall within the scope of the appended claims.

This concludes the description of the preferred embodiment of the invention. The foregoing description of the preferred embodiment of the invention has been presented for the purposes of illustration and description. It is not intended to be exhaustive or to limit the invention to the precise form disclosed. Many modifications and variations are possible in light of the above teaching. It is intended that the scope of the invention be limited not by this detailed description, but rather by the claims appended hereto.

TABLE I

| CDMA Cage | Format | # Sectors | Channels/cage | Erlangs/cage |
|---|---|---|---|---|
| 1 | Sector | 3 | 160 | 141.2 |
| 1 | Omni | 1 | 160 | 141.2 |

TABLE II

| CDMA cage | Format | # Sectors | Channels/ cage | MCC Cards | % of max. channels | Er- langs/ cage | % of max. Erlangs |
|---|---|---|---|---|---|---|---|
| 1 | Sector | 3 | 68 | 9 | 43% | 54 | 38 |
| 1 | Omni | 1 | 27 | 4 | 17% | 17.8 | 13 |

TABLE III

| CDMA cage | Format | # Sectors | Channels/ cage | Erlangs/ cage | Channels/ site | Erlangs/ site |
|---|---|---|---|---|---|---|
| 4 | Sector | 12 | 68 | 54 | 272 | 216 |
| 4 | Omni | 4 | 27 | 18 | 108 | 72 |

TABLE IV

| CDMA cage | Omni | Format | Max. Channels/ hub | Max. Channels/ cage | Er- langs/ cage | Er- langs/ hub | Er- lang % increase |
|---|---|---|---|---|---|---|---|
| 4 | 12 | Sector | 272 | 68 | 54 | 216 | 300% |

TABLE V

| CDMA cage | # Omni | Max. Sectors/ cage | Max. Channels/ hub | Max. elements/ cage | Er- langs/ cage | Er- langs/ hub | Er- lang % increase |
|---|---|---|---|---|---|---|---|
| 4 | 24 | 6 | 500 | 125 | 108 | 432 | 700% |

| % utilization of max. channels | % utilization of max. Erlangs |
|---|---|
| 78% | 85% |

What is claimed is:

1. A cellular communications system for mobile telephones, comprising:

a plurality of independent cell sites having only RF front-end equipment, wherein the mobile telephones change channels as they move from one of the independent cell sites to another of the independent cell sites; and a centralized hub coupled to each of the independent cell sites and comprised of at least one transceiver cage, the transceiver cage generating a plurality of channels for communications thereon, the transceiver cage being configured for operating a single cell site having a plurality of sectors therein, and each of the independent cell sites being treated as one of the sectors by the transceiver cage, wherein the centralized hub further comprises means for transmitting the channels from the transceiver cage to the independent cell sites and means for dynamically assigning the channels among the independent cell sites, so that the channels generated by the transceiver cage are shared by the independent cell sites, thereby increasing channel efficiency.

2. The cellular communications system as set forth in claim 1 above, wherein each of the channels is a radio frequency (RF) channel that communicates a plurality of code division multiple access (CDMA) channels thereon.

3. The cellular communications system as set forth in claim 1 above, wherein the means for dynamically assigning the channels among the independent cell sites comprises a switch and site selector coupled to the transceiver cage and each of the independent cell sites.

4. The cellular communications system as set forth in claim 3 above, wherein the means for dynamically assigning the channels among the independent cell sites further comprises means for measuring communications traffic volume through the hub and each of the independent cell sites.

5. The cellular communications system as set forth in claim 4 above, wherein the means for measuring communications traffic volume through the hub and each of the independent cell sites comprises:

a traffic volume meter for measuring the communications traffic volume through the hub; and a site traffic volume indicator, coupled to the traffic volume meter, for calculating a composite communications traffic volume at each independent cell site at a specified interval and for controlling the switch and site selector to configure the number of channels assigned to the independent cell sites in response to the calculated composite communications traffic volume.

6. A method of cellular communications for mobile telephones, comprising the steps of:

(a) generating a plurality of channels for communications thereon using a transceiver cage located at a centralized hub, the transceiver cage being coupled to a plurality of independent cell sites having only RF front-end equipment, the mobile telephones changing channels as they move from one of the independent cell sites to another of the independent cell sites, the transceiver cage being configured for operating a single cell site having a plurality of sectors therein, and each of the independent cell sites being treated as one of the sectors by the transceiver cage;

(b) transmitting the channels from the transceiver cage to the independent cell sites; and (c) dynamically assigning the channels among the independent cell sites coupled to the transceiver cage, so that the channels generated by the transceiver cage are shared by the independent cell sites, thereby increasing channel efficiency.

7. A hub for a cellular communications system, comprising:

a plurality of transceivers generating a plurality of channels for communications thereon;

means for transmitting the channels from the transceivers to a plurality of independent cell sites having only RF front-end equipment coupled to the hub, wherein mobile telephones change channels as they move from one of the independent cell sites to another of the independent cell sites;

means for measuring communications traffic volume through the hub and each of the independent cell sites; and means for dynamically assigning the channels generated by the transceivers among the independent cell sites in response to the measured communications traffic volume, so that the channels generated by the transceiver cage are shared by the independent cell sites, thereby increasing channel efficiency.

8. The hub for a cellular communications system as set forth in claim 7 above, wherein each of the channels is a radio frequency (RF) channel that communicates a plurality of code division multiple access (CDMA) channels thereon.

9. The hub for a cellular communications system as set forth in claim 7 above, wherein the means for dynamically assigning the channels among the independent cell sites comprises a switch and site selector coupled to each of the transceivers and each of the independent cell sites.

10. The hub for a cellular communications system as set forth in claim 9 above, wherein the means for measuring communications traffic volume through the hub and each of the independent cell sites comprises;

a traffic volume meter for measuring traffic volume through the hub; an a site traffic volume indicator, coupled to the traffic volume meter, for calculating a composite traffic volume at each independent cell site at a specified interval and for controlling the switch and site selector to configure the number of channels assigned to the independent cell sites in response to the calculated composite traffic volume.

11. A method of cellular communications for mobile telephones, comprising the steps of:

(a) generating a plurality of RF channels using transceivers located at a centralized hub;

(b) transmitting the RF channels from the centralized hub to a plurality of independent cell sites having only RF front-end equipment coupled to the centralized hub, wherein the mobile telephones change channels as they move from one of the independent cell sites to another of the independent cell sites;

(c) measuring communications traffic volume through the centralized hub and each of the independent cell sites; and (d) dynamically assigning the RF channels among the independent cell sites in response to the measured communications traffic volume, so that the channels generated by the transceiver cage are shared by the independent cell sites, thereby increasing channel efficiency.

12. The method of cellular communications as set forth in claim 11 above, wherein each of the RF channels communicates a plurality of code division multiple access (CDMA) channels thereon.

13. The method of cellular communications as set forth in claim 11 above, wherein the dynamically assigning step is performed by a switch and site selector coupled to the transceivers and each of the independent cell sites.

14. The method of cellular communications as set forth in claim 13 above, wherein the measuring step comprises the steps of:

measuring the communications traffic volume through the centralized hub;

calculating a composite communications traffic volume at each of the independent cell sites at a specified interval; and controlling the switch and site selector to configure the number of channels assigned to the independent cell sites in response to the calculated composite communications traffic volume.

* * * * *

UNITED STATES PATENT AND TRADEMARK OFFICE
CERTIFICATE OF CORRECTION

PATENT NO. : 5,758,287

DATED : May 26, 1998

INVENTOR(S) : William Chien-Yeh Lee, David Anthony Pasquel and Ronald S. Rudokas It is certified that error appears in the above-identified patent and that said Letters Patent is hereby corrected as shown below:

Column 8, line 25, after "equipment" insert --which are--.

Column 9, line 1, after "equipment" insert --which are--.

Signed and Sealed this

Fourth Day of January, 2000

Attest:

Attesting Officer

*Acting Commissioner of Patents and Trademarks*